(12) United States Patent
Dodge

(10) Patent No.: US 7,081,831 B2
(45) Date of Patent: Jul. 25, 2006

(54) TIME-DOMAIN SIGNAL CANCELLATION IN DOWNHOLE TELEMETRY SYSTEMS

(75) Inventor: Carl Dodge, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 537 days.

(21) Appl. No.: 10/651,414

(22) Filed: Aug. 29, 2003

(65) Prior Publication Data
US 2005/0046585 A1    Mar. 3, 2005

(51) Int. Cl.
*G01V 3/00*    (2006.01)

(52) U.S. Cl. ............... 340/855.4; 340/854.9; 340/853.1

(58) Field of Classification Search ............ 340/853.3, 340/854.4, 854.5, 855.5; 367/83; 167/65.1
See application file for complete search history.

(56) References Cited

U.S. PATENT DOCUMENTS 6,469,636 B1 * 10/2002 Baird et al. ............... 340/854.9
6,657,551 B1 * 12/2003 Huckaba et al. .......... 340/855.4
6,914,538 B1 * 7/2005 Baird et al. ............... 340/854.9

* cited by examiner

Primary Examiner—Jeffery Hofsass
Assistant Examiner—Kimberly Jenkins
(74) Attorney, Agent, or Firm—Conley Rose, P.C.

(57) ABSTRACT

A downhole telemetry system having a surface transceiver, a cable, and a downhole transceiver coupled to the surface transceiver via the cable. The surface transceiver isolates an uplink signal from a combined uplink/downlink signal on the cable using time-domain signal cancellation. The downhole transceiver isolates a downlink signal from the combined uplink/downlink signal using time-domain signal cancellation. In the surface transceiver, the time-domain signal cancellation may be performed by running the combined uplink/downlink signal through a coil of a transformer while running a copy of the downlink signal through an opposite coil of the transformer. Likewise, in the downhole transceiver, the time-domain signal cancellation may be performed by running the combined uplink/signal through a coil of a transformer while running a copy of the uplink signal through an opposite coil of the transformer.

25 Claims, 6 Drawing Sheets

TIME-DOMAIN SIGNAL CANCELLATION IN DOWNHOLE TELEMETRY SYSTEMS

BACKGROUND

Modern petroleum drilling and production operations demand a great quantity of information relating to parameters and conditions downhole. Such information typically includes characteristics of the earth formations traversed by the wellbore, along with data relating to the size and configuration of the borehole itself. The collection of information relating to conditions downhole is commonly referred to as "logging."

In conventional oil well wireline logging, a probe or "sonde" housing formation sensors is lowered into the borehole after some or all of the well has been drilled, and is used to determine certain characteristics of the formations traversed by the borehole. The upper end of the sonde is attached to a conductive wireline that suspends the sonde in the borehole. Power is transmitted to the sensors and instrumentation in the sonde through the conductive wireline. Similarly, the instrumentation in the sonde communicates information to the surface by electrical signals transmitted through the wireline.

Commonly, a single transformer is used uphole to couple downlink signals onto the wireline and remove (i.e. strip) uplink signals from the wireline. Likewise, a single transformer may be used downhole to couple uplink signals onto the wireline and remove downlink signals from the wireline. More specifically, the uphole (surface) transformer acts to couple signals from the uphole transmitter to the cable and remove signals on the cable from the downhole transmitter for processing by the uphole receiver. The downhole transformer typically performs the reverse operation, i.e., the downhole transformer acts to couple signals from the downhole transmitter to the cable and remove signals on the cable from the uphole transmitter for processing by the downhole receiver. Signal outputs from these transformers are fed into frequency filtering networks to separate uplink signals from downlink signals both at the surface and downhole. The goal of the filtering circuits is to remove the strong local signal so that it does not interfere with the weaker signal coming from the opposite end of the cable.

Unfortunately, frequency filtering reduces the total amount of available bandwidth that may be used for telemetry signals. Additionally, it is difficult to attain optimal signal transmission and reception with a single coupling transformer since uplink and downlink signals are typically transferred over separate frequency bands (i.e., the transformer itself may filter one frequency band more than another). A telemetry system that overcomes these issues would be desirable. In general, methods and systems that increase the data rate capacity and/or reliability of uplink and downlink data transmissions are continually being sought.

SUMMARY

Accordingly, there is disclosed herein a telemetry system having circuitry to separate uplink and downlink signals using time-domain signal cancellation. In at least some embodiments, the telemetry system comprises an uphole tranceiver, a wireline cable, and a downhole transceiver coupled to the surface transceiver via the cable. The uphole and downhole transceivers employ time-domain signal cancellation to separate uplink and downlink signal. In at least some embodiments, the telemetry system uses a seven-conductor wireline. In other embodiments, the telemetry system may use a three-conductor wireline.

In some embodiments, an uphole tranceiver couples downlink signals to the wireline using a first set of transformers and removes uplink and downlink signals from the wireline using a second set of transformers. The downhole transceiver couples uplink signals to the wireline using a third set of transformers and removes uplink and downlink signals from the wireline using a fourth set of transformers. In at least some embodiments, the first, second, third, and fourth sets of transformers are impedance matched with elements to provide optimized power transfer of uplink and downlink signals. In at least some embodiments, the referred to sets of transformers may each comprise one or more transformers.

The time-domain cancellation circuitry may comprise a transformer. If a transformer is used, signal cancellation may be accomplished by coupling a combined uplink/downlink signal to the secondary winding of the canceling transformer while coupling a copy of the signal to be cancelled to the primary winding of the canceling transformer. In other embodiments, the time-domain cancellation circuitry may comprise an operational amplifier connected in a summing junction configuration. In at least some embodiments, the time-domain cancellation circuitry is implemented in both the uphole and downhole transceivers.

BRIEF DESCRIPTION OF THE DRAWINGS

For a detailed description of various embodiments of the invention, reference will now be made to the accompanying drawings in which.

Figure 1:
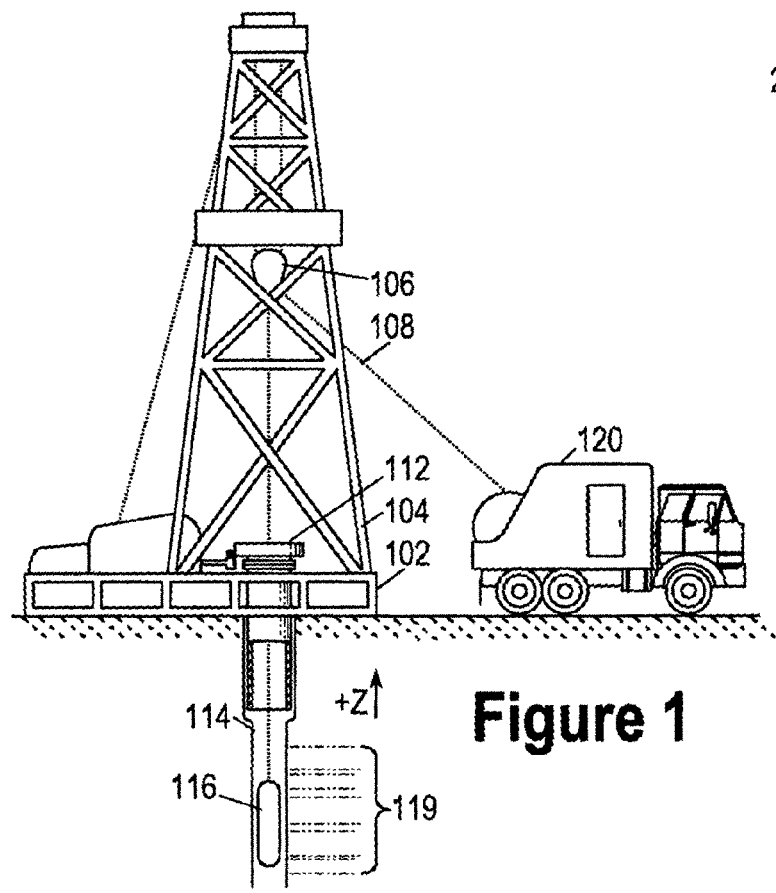
FIG. 1 shows a wireline sonde being run through a well.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The terms uplink and downlink refer generally, in the context of this disclosure, to the transmission of information from subsurface equipment to surface equipment, and from surface equipment to subsurface equipment, respectively. Additionally, the terms surface and subsurface are relative terms. The fact that a particular piece of hardware is described as being on the surface does not necessarily mean it must be physically above the surface of the Earth; but rather, describes only the relative location of the surface and subsurface pieces of equipment.

DETAILED DESCRIPTION

The subject matter disclosed herein generally relates to wireline telemetry systems (e.g. full duplex systems) that transmit data between surface tools and subsurface tools using the same cable transmission mode for both uplink and downlink signals. The data is typically transferred by connecting two transceivers (an uphole and a downhole transceiver) via a wireline. During logging operations, digitized uplink and downlink data are modulated on various frequency subchannels using DMT modulation. The modulated signal is then converted to an analog signal that can be transferred over the wireline.

It is desirable to use one cable transmission mode to send telemetry signals from the surface to the sonde downhole and the same cable transmission mode to send signals from downhole to the surface. This leaves other cable transmission modes available for other telemetry functions or for power transmission to from the surface to the downhole instruments.

Current technology permits allocating the uplink data to a first set of frequency subchannels and downlink data to another set of frequency subchannels so that both uplink and downlink data may be transmitted over a wireline cable at the same time. For example, existing uphole transceivers may be designed to receive the signal on the wireline and filter out all data except data allocated to a pre-determined uplink frequency range. Likewise, downhole transceivers may be designed to receive the same signal on the wireline, but filter out all data except data allocated to a pre-determined downlink frequency range.

Telemetry system embodiments disclosed herein preferably separate uplink and downlink signals using time-domain signal cancellation instead of frequency filtering as described above. Benefits of using time-domain cancellation may include, but are not limited to, freeing up frequency subchannels previously used as dead bands (or guard bands) between subchannels allocated to uplink data and subchannels allocated to downlink data, and providing more flexibility to change which subchannels are allocated for uplink data transmission and which are allocated for downlink data transmission.

Using discrete multi-tone (DMT) modulation, existing system may allocate uplink signals and downlink signals to two sets of frequency subchannels. Downlink signals may be allocated to a set of low frequency subchannels (e.g. subchannels 2–3) and uplink signals may be allocated to a set of higher frequency subchannels (e.g. subchannels 8–63). Subchannels 4–7, which occupy frequencies from 12.9375 kHz to 34.5 kHz may be used as a "dead band" (i.e. neither uplink nor downlink data would be transmitted over subchannels 4–7). The dead band may not be used because analog frequency filters are unable to completely separate adjacent signal frequencies without unduly distorting the signals. The use of analog frequency filters to separate the uplink and downlink signals may further limit the flexibility of the telemetry system because uplink and downlink signals must stay within the frequency bands designated by the analog filters to be effectively transmitted.

As disclosed herein, some telemetry system embodiments may eliminate the need for a dead band, thus providing more bandwidth and flexibility when allocating subchannels for uplink or downlink data transmission. In general, optimal signal transmission usually involves matching the transmitter impedance to the transmission line while optimal signal reception usually involves deriving the highest signal to noise ratio possible. It is therefore difficult to attain optimal signal transmission and reception with a single coupling transformer if that transformer attenuates some frequencies more than others.

Turning now to the figures, FIG. 1 shows a well during wireline logging operations. A drilling platform 102 is equipped with a derrick 104 that supports a hoist 106. Drilling of oil and gas wells is commonly carried out by a string of drill pipes connected together by "tool" joints so as to form a drilling string that is lowered through a rotary table 112 into a wellbore 114. In FIG. 1, it is assumed that the drilling string has been temporarily removed from the wellbore 114 to allow a sonde 116 to be lowered by wireline 108 into the wellbore 114. Typically, the sonde 116 is lowered to the bottom of the region of interest and subsequently pulled upward at a constant speed. During the upward trip, the sonde 116 performs measurements on the formations 119 adjacent to the wellbore as they pass by. The measurement data is communicated to a logging facility 120 for storage, processing, and analysis. The sonde and the logging facility 120 preferably employ telemetry transmitters and receivers having discrete multi-tone (DMT) modulation and dynamic bandwidth allocation.

Figure 2A:
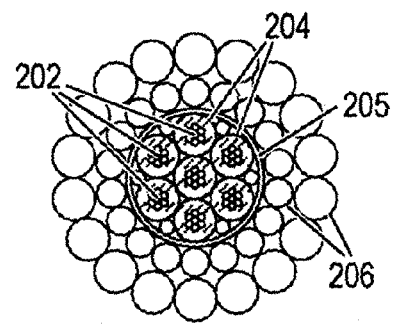
FIGS. 2a and 2b show a cross-section of a seven-conductor wireline cable.
Figure 2B:
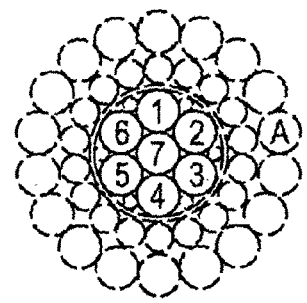

FIG. 2a shows a cross-section of a typical wireline cable (e.g., wireline 108) having multiple conductors 202. Each of the conductors 202 is surrounded by an insulating jacket 204. The insulated conductors are bundled together in a semiconductive wrap 205, which is surrounded by two layers of counterwound metal armor wire 206. Being made of metal, the armor wires are conductive and may be used as an eighth conductor. FIG. 2b shows a cross-section of the same wireline cable having its conductors numbered 1–7 and its armor labeled A.

Figure 2C:
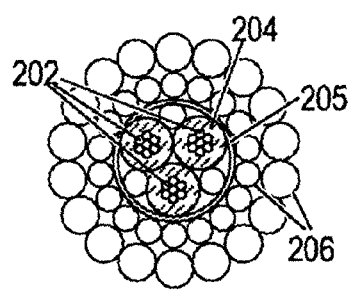
FIGS. 2c and 2d show a cross-section of a three-conductor wireline cable.
Figure 2D:
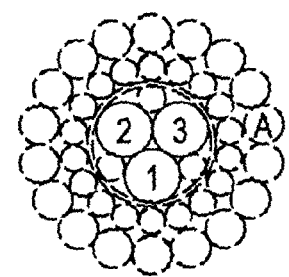

FIG. 2c shows a cross-section of another wireline cable (e.g., wireline 108) having three conductors 202. Again, each of the conductors 202 is surrounded by an insulating jacket 204. The insulated conductors are bundled together in a semiconductive wrap 205, which is surrounded by two layers of counterwound metal armor wire 206. Being made of metal, the armor wires are conductive and may be used as a fourth conductor. FIG. 2d shows a cross-section of the wireline cable of FIG. 2c having its conductors numbered 1–3 and its armor labeled A. The notations used in FIGS. 2b and 2d will be used in describing embodiments of the invention.

Figure 3:
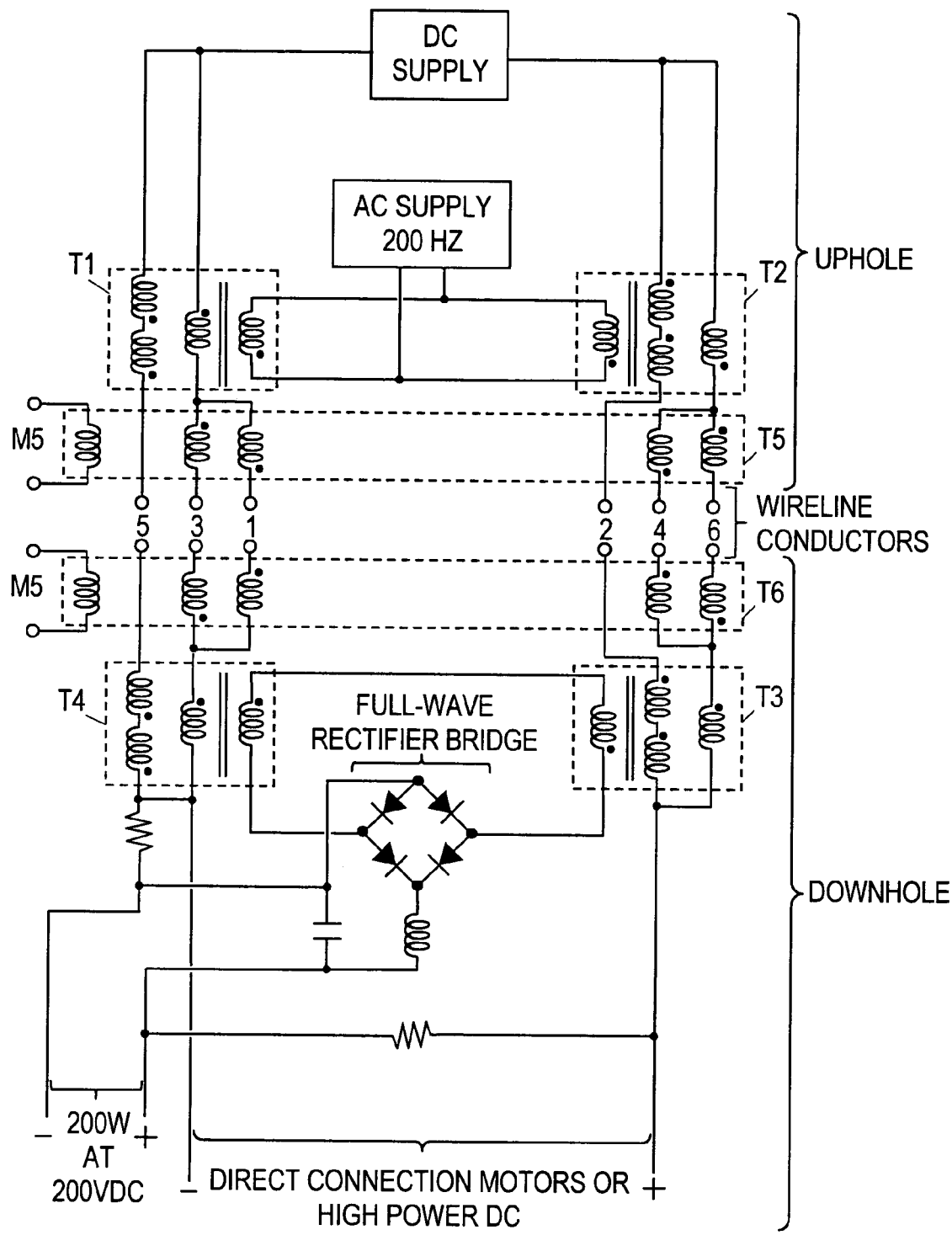
FIG. 3 shows orthogonal mode transmission and receiving circuitry.

FIG. 3 shows telemetry circuitry that makes use of orthogonal transmission modes. The telemetry circuitry of FIG. 3 illustrates the use of a single transformer, T5, to transmit and receive telemetry signals uphole (at the surface) and another single transformer, T6, to transmit and receive telemetry signals downhole. Signals provided to terminals M5 are impressed by driving conductors 1 and 4 with one polarity while driving conductors 3 and 6 with the opposite polarity. This excites mode M5 in the cable whereby transceivers (not shown) coupled to the M5 terminals may transmit and receive telemetry signals.

Transformers T1–T4 are power transformers. T1 and T2 transmit a DC power signal and AC power signal from the surface when appropriate modes are excited. For example, one power mode may be excited by driving conductors 4 and 6 at voltage V, driving conductor 2 at voltage −2V, driving conductors 3 and 1 at voltage −V, and driving conductor 5 at voltage 2V. Another power mode may be excited when conductors 1, 3, and 5 are driven with one polarity (e.g., voltage V) while conductors 2, 4, and 6 are driven with the opposite polarity (e.g. voltage −V). Orthogonal modes are discussed in greater detail in U.S. Pat. No. 6,469,636 entitled, "High-Power Well Logging Method and Apparatus," which is herein incorporated by reference.

The power transmitted from the surface is received by downhole transformers, T3 and T4, where it may be use to supply power to logging tool electronics. As shown, a full-wave rectifier bridge may be used to convert the transmitted AC power to DC power. The use of transmission modes eliminates signal cross-talk which would otherwise be caused by inductive and capacitive coupling between the conductors in the multi-conductor cable.

Figure 4A:
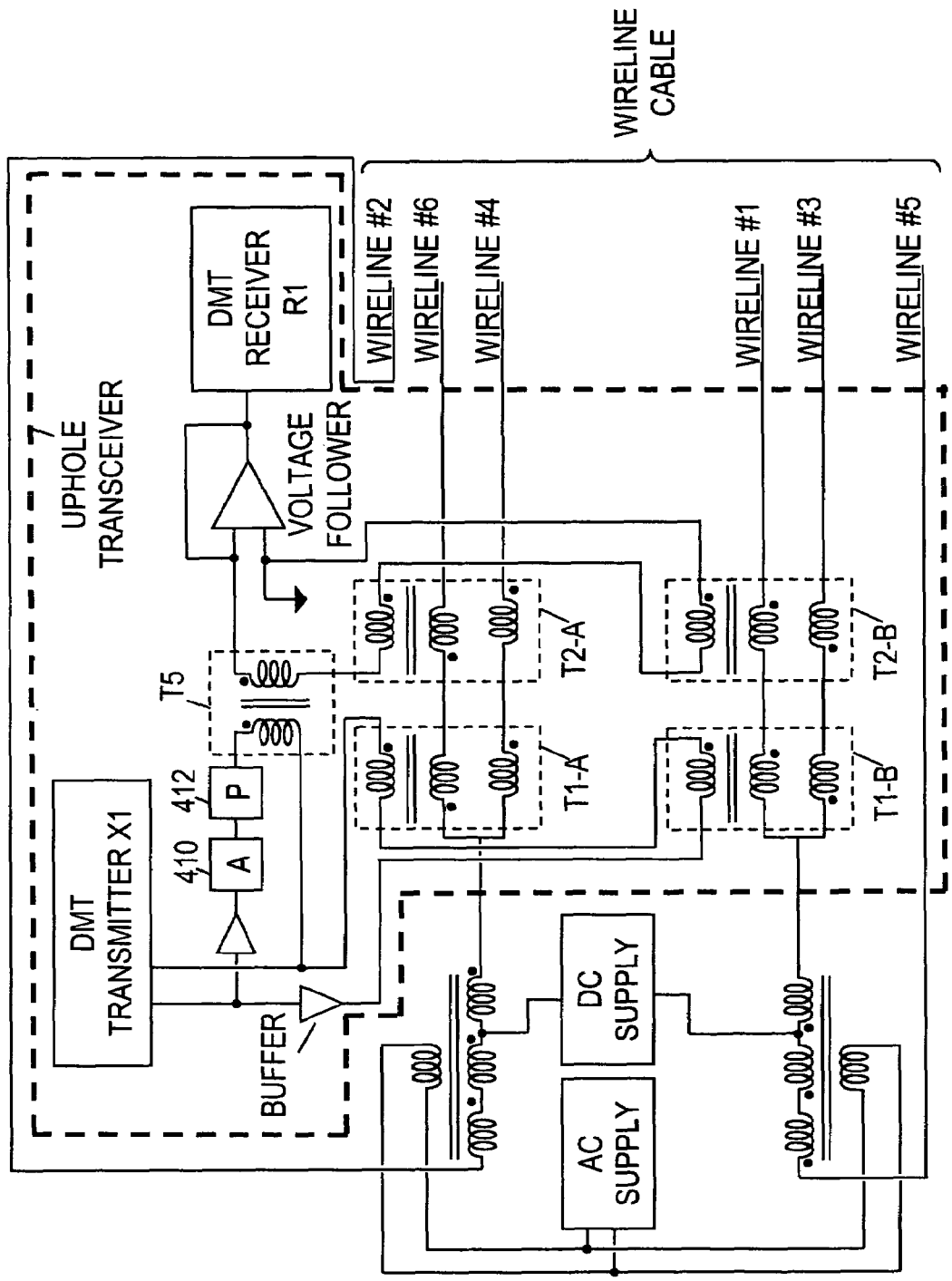
FIG. 4a shows an uphole transceiver system used with a seven-conductor wireline according an embodiment of the invention.

FIG. 4a shows an uphole transceiver system according to an embodiment of the invention. In a preferred embodiment, the uphole transceiver uses transmission mode M5 to transmit/receive signals over the wireline cable. In operation, DMT transmitter X1 outputs a downlink signal. The downlink signal is coupled to the wireline cable by transformers T1-A and T1-B. In a preferred embodiment, T1-A and T1-B are optimized to operate at high signal levels over a frequency band allocated for downlink data transmission. For example, if downlink signals are transmitted over a frequency range from approximately 4 kHz to 12 kHz, T1-A and T1-B would preferably be optimized to operate within that frequency band.

In order to optimize the downlink coupling operation of T1-A and T1-B, the coils of T1-A and T1-B may have a turns ratio so that the transmitter output impedance (typically 50 ohms) is matched to the cable characteristic impedance over the frequency range allocated for downlink transmissions. In a preferred embodiment, transformers T1-A, T1-B, T2-A, and T2-B are connected so as to activate wireline eigenmode 5. For example, past measurements of eigenmode 5 show that the cable characteristic impedance over the 4–13 kHz range is approximately 100 ohms (capacitively reactive). It is noted that embodiments of the uphole transceiver system may be designed to couple downlink transmissions to the wireline cable over any pre-determined frequency range.

The uphole transceiver system of FIG. 4a receives uplink data from the wireline cable using transformers T2-A and T2-B. In some embodiments, the signal receiving circuitry is optimized to provide the highest signal-to-noise ratio possible. The optimization may be accomplished by impedance matching components of the system. In some embodiments, the input to the voltage follower preceeding DMT receiver R1 in FIG. 4a has a high input impedance, while the cable impedance of transmission mode 5 over the uplink frequency range could typically vary from 30 to 60 ohms depending on the frequency. Thus the transformers T2-A and T2-B may be designed so that the series combination of T2-A and T2-B will convert a 30 to 60 ohm mode 5 cable impedance to several hundred ohms input impedance to the voltage follower. Therefore, the turns ratio of the transformers may be designed so that the transformer windings with fewer turns would be connected in series with the cable conductors and the windings with more turns would be connected in series to provide an input to the voltage follower.

Additionally, T2-A and T2-B are preferably optimized to operate over a frequency range allocated for the transmission of uplink data. For example, if uplink data is transmitted/received over a frequency band of approximately 30 kHz to 256 kHz, transformers T2-A and T2-B would use a number of turns (in the primary and secondary coils) so as to optimize power transfer over the wireline cable at these frequencies. In general, impedance of an inductor varies according to a signal frequency (e.g. 100 kHz) and the square of the number of turns in the inductor coil.

Therefore, in embodiments of the uphole transceiver in which the uplink data is transmitted over a higher frequency band than downlink data, T2-A and T2-B may use primary winding with fewer turns than T1-A and T1-B in order to impedance match with the frequency band of uplink data transmission. "Primary" in this discussion refers to those windings in series with the cable conductors. In a preferred embodiment, T2-A and T2-B may be optimized for operation between approximately 12 kHz to 256 kHz, while T1-A and T1-B may be optimized for operation between approximately 4 kHz to 12 kHz. It is noted that in such embodiments, the traditional dead band from approximately 13 kHz to 35 kHz has been allocated for uplink data transmission.

The receiving transformers T2-A and T2-B pick up not only the desired uplink signal, but the unwanted downlink signal as well. In order to separate the local transmitter signal (downlink signal) from the uplink signal, a replica (copy) of the downlink signal is preferably subtracted from the combined uplink/downlink signal received by T2-A and T2-B. As shown, transformer T5 may be used to subtract the replica of the downlink signal from the combined received signal. The result preferably isolates the uplink signal (i.e. the downlink signal and negative downlink signal cancel each other) which is passed through a voltage follower to DMT receiver R1 for processing.

Due to a variety of possible reasons relating to transformer fabrication and function, e.g. coil length, coil tightness, electrical connections (solder joints), materials used for coils and core, etc., every transformer is essentially unique. Therefore, complete cancellation of the downlink signal, as described above, may require additional components. As shown in FIG. 4a, the downlink replica may be fine-tuned or otherwise regulated (modified) using an amplitude adjustment block 410 and/or a phase adjustment block 412 such that downlink signal and the replica essentially cancel each other out across transformer T5. In at least some embodiments, the amplitude adjustment block 410 may comprise a resistive filter, while the phase adjustment block 412 may comprise a capacitive and/or inductive filter. While complete downlink signal cancellation is desirable, it is sufficient to attenuate the downlink signal to a level that it is comparable in magnitude with the uplink in the adjacent DMT channels.

Alternatively, the downlink replica may be fine-tuned or otherwise regulated to closely match the downlink signal using an adaptive filter. The use of adaptive filters is a well developed art, and details of adaptive tools and techniques are set forth in S. Haykin, "Adaptive Filter Theory", Prentice Hall (1986), which is herein incorporated by reference.

Figure 4B:
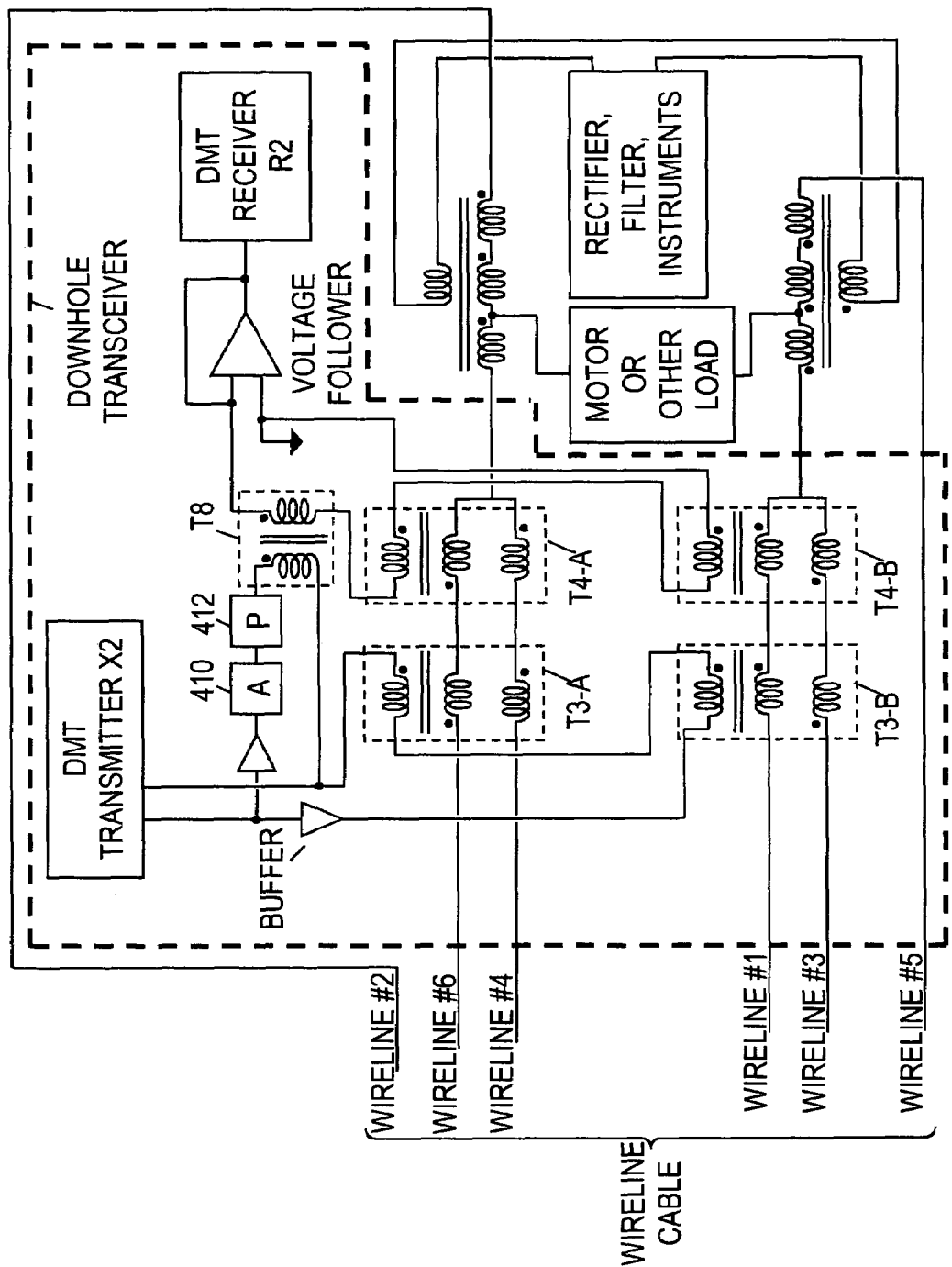
FIG. 4b shows a downhole transceiver system used with a seven-conductor wireline according to an embodiment of the invention.

FIG. 4b shows an embodiment of a downhole transceiver system. In many respects, the downhole transceiver system functions similarly to the uphole transceiver system. In a preferred embodiment, the uphole transceiver system of FIG. 4a and the downhole transceiver system of FIG. 4b may transmit/receive DMT modulated signals via a seven-conductor wireline cable.

When using the uphole transceiver system of FIG. 4a and the downhole transceiver system of FIG. 4b, it is desirable to match impedances between transmitters, transformers, receivers, and the wireline cable, such that maximum power is transmitted and signal reflections are reduced as much as possible. Therefore, one or more design rules calculated to maximize power transfer may be implemented when designing the telemetry system described herein. Some general rules that may be implemented when designing at least some embodiments of the invention are shown in Table 1 below.

TABLE 1

| System Element | Frequency of operation (kHz) | Impedance of coupling transformer(s) secondary winding | Impedance of coupling transformer(s) primary winding in series with cable conductors |
|---|---|---|---|
| Uphole receiver | 12–256 | High (Mega ohms) | ~50 ohms |
| Uphole transmitter | 4–12 | Low (~10 to 50 ohms) | ~100 ohms |
| Downhole receiver | 4–12 | High (Mega ohms) | ~100 ohms |
| Downhole tranmsitter | 12–256 | Low (~10 to 50 ohms) | ~50 ohms |

While these rules may be helpful when designing telemetry system embodiments as described herein, the above shown rules are not intended to limit telemetry system embodiments to any particular design, i.e., the operating frequency and impedances shown above may change according to other embodiments.

Returning to the downhole transceiver of FIG. 4b, DMT transmitter X2 preferably outputs an uplink signal over a pre-determined frequency band. The uplink signal is coupled to the wireline cable by transformers T3-A and T3-B. In a preferred embodiment, T3-A and T3-B are optimized to operate at high signal levels over the frequency band allocated for uplink data transmission. For example, if uplink signals are transmitted over a frequency range from approximately 32 kHz to 256 kHz, T3-A and T3-B would preferably be optimized to operate within that frequency band.

In order to optimize the uplink coupling operation of T3-A and T3-B, the number of turns used in the primary and secondary coils of T3-A and T3-B may be designed to impedance match (over a pre-determined frequency range) the transmitter output impedance and cable characteristic impedance, respectively. In a preferred embodiment, transformers T3-A, T3-B, T4-A, and T4-B are connected so as to activate wireline eigenmode 5. It is noted that embodiments of the downhole transceiver may be designed to couple uplink transmissions to the wireline cable over any pre-determined frequency range.

The downhole transceiver system of FIG. 4b receives downlink data from the wireline cable using transformers T4-A and T4-B. T4-A and T4-B are preferably optimized to operate over a frequency range allocated for the transmission of downlink data. For example, if downlink data is transmitted/received over a frequency band of approximately 4 kHz to 12 kHz, transformers T4-A and T4-B may use a number of primary turns and secondary turns to match the impedances of the wireline cable and input impedance of DMT receiver R2. As previously mentioned, impedance of an inductor varies according to the frequency of operation and the number of turns in the inductor coil. In a preferred embodiment, T3-A and T3-B may be optimized to operate between approximately 12 kHz to 256 kHz, while T4-A and T4-B may be optimized to operate approximately between 4 kHz to 12 kHz.

The receiving transformers T4-A and T4-B pick up not only the desired downlink signal, but the unwanted uplink signal as well. In order to separate the local transmitter signal (uplink signal) from the downlink signal, a replica of the uplink signal is preferably subtracted from the combined uplink/downlink signal received by T4-A and T4-B. As shown, transformer T8 may be used to subtract the replica of the uplink signal from the combined received signal. The result preferably isolates the downlink signal (i.e. the uplink signal and negative uplink signal cancel each other) which is passed through a voltage follower to DMT receiver R2 for processing.

In alternative embodiments of the transceivers of FIGS. 4a and 4b, an operational amplifier configured as an inverting amplifier with a summing junction having two inputs may be used to provide isolation of the uplink or downlink signal from the combined received signal. In such embodiments, one of the two inputs to the summing junction may be the combined uplink/downlink signal while the second input to the summing junction is the negative of the replica of the signal to be cancelled.

As previously described for the transformers of FIG. 4a, transformers T3-A, T3-B, T4-A, T4-B, and T8 may have unique performance characteristics, thereby causing incomplete cancellation of the uplink signal. Therefore, the uplink replica may be fine-tuned or otherwise regulated (modified) using an amplitude adjustment block 410 and/or a phase adjustment block 412 such that uplink signal and the replica essentially cancel each other out across transformer T8.

As previously described, the amplitude adjustment block 410 may comprise a resistive filter, and the phase adjustment block 412 may comprise a capacitive and/or inductive filter. Alternatively, an adaptive filter may be used to match the uplink replica with the uplink signal as described above.

Figure 5A:
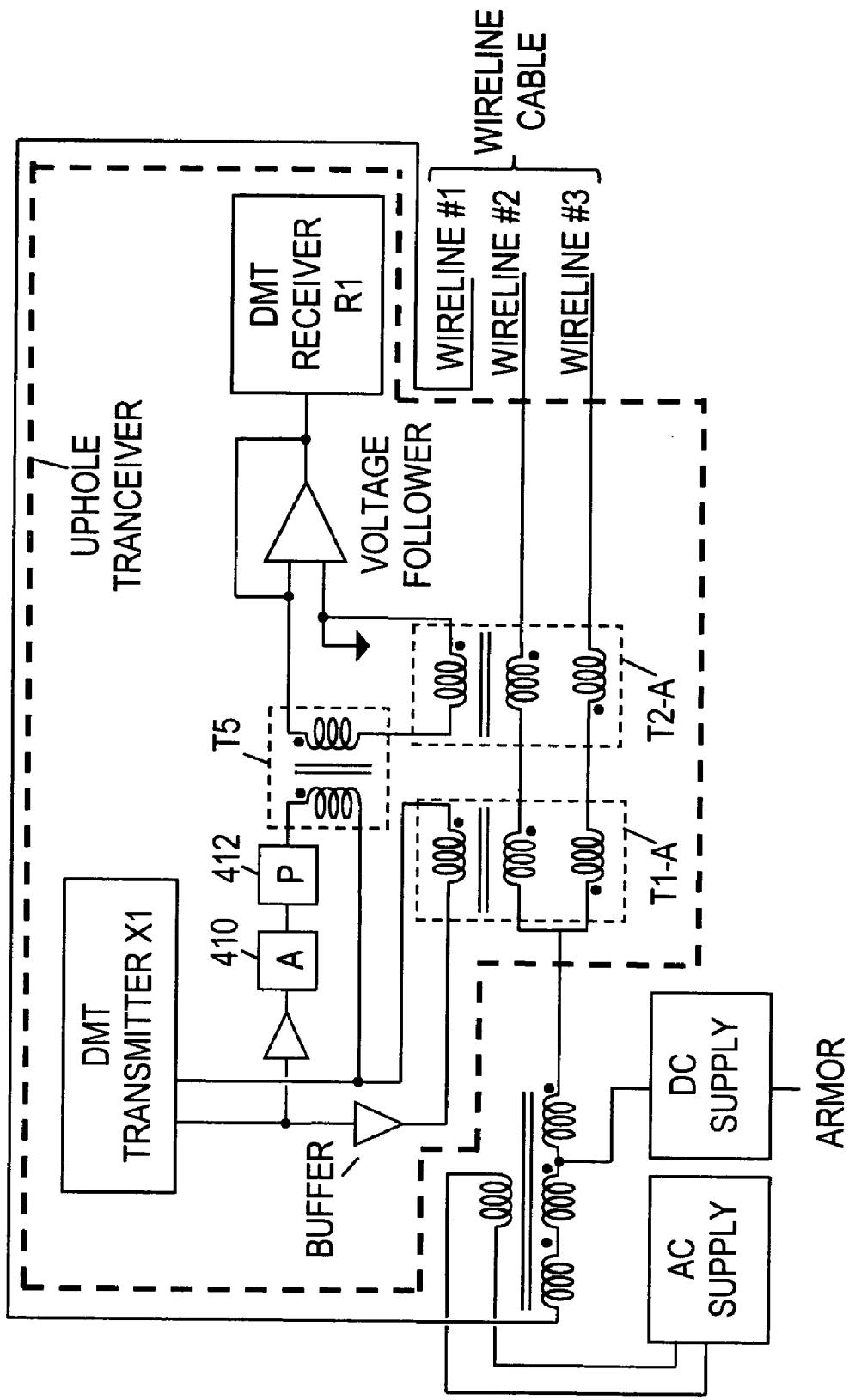
FIG. 5a shows an uphole transceiver system used with a three-conductor wireline according to an embodiment of the invention.

FIG. 5a shows an uphole transceiver system according to another downhole telemetry system embodiment. As shown in FIG. 5a, the uphole transceiver may be used with a three-conductor wireline cable. A circularly symmetric 3-conductor wireline such as shown in FIGS. 2c and 2d may be used to transmit three independent signals by using certain symmetrical transmission modes. Signals transmitted on these modes interfere only minimally with each other regardless of frequency because the symmetrical connections to the cable conductors act to cancel the effects of mutual inductance and capacitance between armor and other conductors. One such set of transmission modes (known as eigenmodes) are shown below in Table 2.

TABLE 2

| Conductor | Signal weight (Mode 1) | Signal weight (Mode 2) | Signal weight (Mode 3) |
|---|---|---|---|
| #1 | 0 | −2 | +1 |
| #2 | +1 | +1 | +1 |
| #3 | −1 | +1 | +1 |

As shown in Table 2, mode 1 may be activated by transmitting no signal (weight "0") on conductor #1, a positive voltage (weight "+1") on conductor #2, and a negative voltage (weight "−1") on conductor #3. Mode 1 may be used to transmit signals in both directions simultaneously, i.e., a bi-directional mode, wherein preferably no telemetry bypass capacitors (not shown) are used to complete the telemetry circuit either at the surface or downhole. The telemetry bypass capacitors are not necessary since there is a short between conductors #2 and #3 immediately following the telemetry transformers in both the surface and downhole transceivers. Additionally, the transformer windings T1-A, T2-A, T3-A, and T4-A in series with conductors #2 and #3 should be as similar as possible and contain the same number of turns. In some embodiments, special transformers called multifilar transformers may be used.

As shown in Table 2, mode 2 may be activated by transmitting a negative voltage (weight "−2") on conductor #1, a positive voltage (weight "+1") on conductor #2, and a positive voltage (weight "+1") on conductor #3. Mode 2 is preferably used to transmit AC power to instrumentation downhole. Mode 3 may be activated by transmitting a positive voltage (weight "+1") on conductors #1, #2, and #3. Mode 3 is preferably used to transmit DC power to motors or other intermittent (i.e., non-continuous) loads downhole. When transmitting DC power, the conductor line (i.e., logging line) armor wires may be used to carry current from the surface to the downhole load while the load current returns to the surface DC supply in the opposite direction on conductors #1, #2, and #3. In some embodiments, mode 3 may be used to carry a reference voltage between the surface and downhole so that a potential between a downhole electrode and a surface electrode may be measured.

In operation, DMT transmitter X1 outputs a downlink signal. The downlink signal is coupled to the wireline cable by transformer T1-A. In a preferred embodiment, T1-A is optimized to operate at high signal levels over a frequency band allocated for downlink data transmission. In at least some embodiments, T1-A may be optimized to operate between approximately 4 kHz to 12 kHz. In order to optimize the downlink coupling operation of T1-A, the coils of T1-A may have a turns ratio so that the transmitter output impedance (typically 50 ohms) is preferably matched to the cable characteristic impedance over a frequency range allocated for downlink transmissions.

The uphole transceiver system of FIG. 5a receives uplink data from the wireline cable using transformer T2-A. T2-A is preferably optimized to operate over a frequency range allocated for the transmission of uplink data. For example, if uplink data is transmitted/received over a frequency band of approximately 30 kHz to 256 kHz, transformer T2-A would preferably use a number of turns in the primary and secondary coils so as to match impedances (at those frequencies) with the transmitter output impedance and wireline cable. For example, in embodiments of the uphole transceiver in which the uplink data is transmitted over a higher frequency band than downlink data, T2-A would use less turns than T1-A. In a preferred embodiment, T2-A may be optimized to operate between approximately 12 kHz to 256 kHz.

The receiving transformer T2-A not only picks up the desired uplink signal, but the unwanted downlink signal as well. In order to separate the local transmitter signal (downlink signal) from the uplink signal, a replica of the downlink signal is preferably subtracted from the combined uplink/downlink signal received by T2-A. As shown, a transformer T5 may be used to subtract the replica of the downlink signal from the combined received signal. The result preferably isolates the uplink signal (i.e. the downlink signal and negative downlink signal cancel each other) which is passed through a voltage follower to DMT receiver R1 for processing. As explained above, the downlink replica may be fine-tuned or otherwise regulated (modified) using an amplitude adjustment block 410 and/or a phase adjustment block 412 such that downlink signal and the replica essentially cancel each other out across transformer T5 more completely. As previously explained, the amplitude adjustment block 410 may comprise a resistive filter, and the phase adjustment block 412 may comprise a capacitive and/or inductive filter. Alternatively, an adaptive filter may be implemented to carry out the fine-tuning process described above.

Figure 5B:
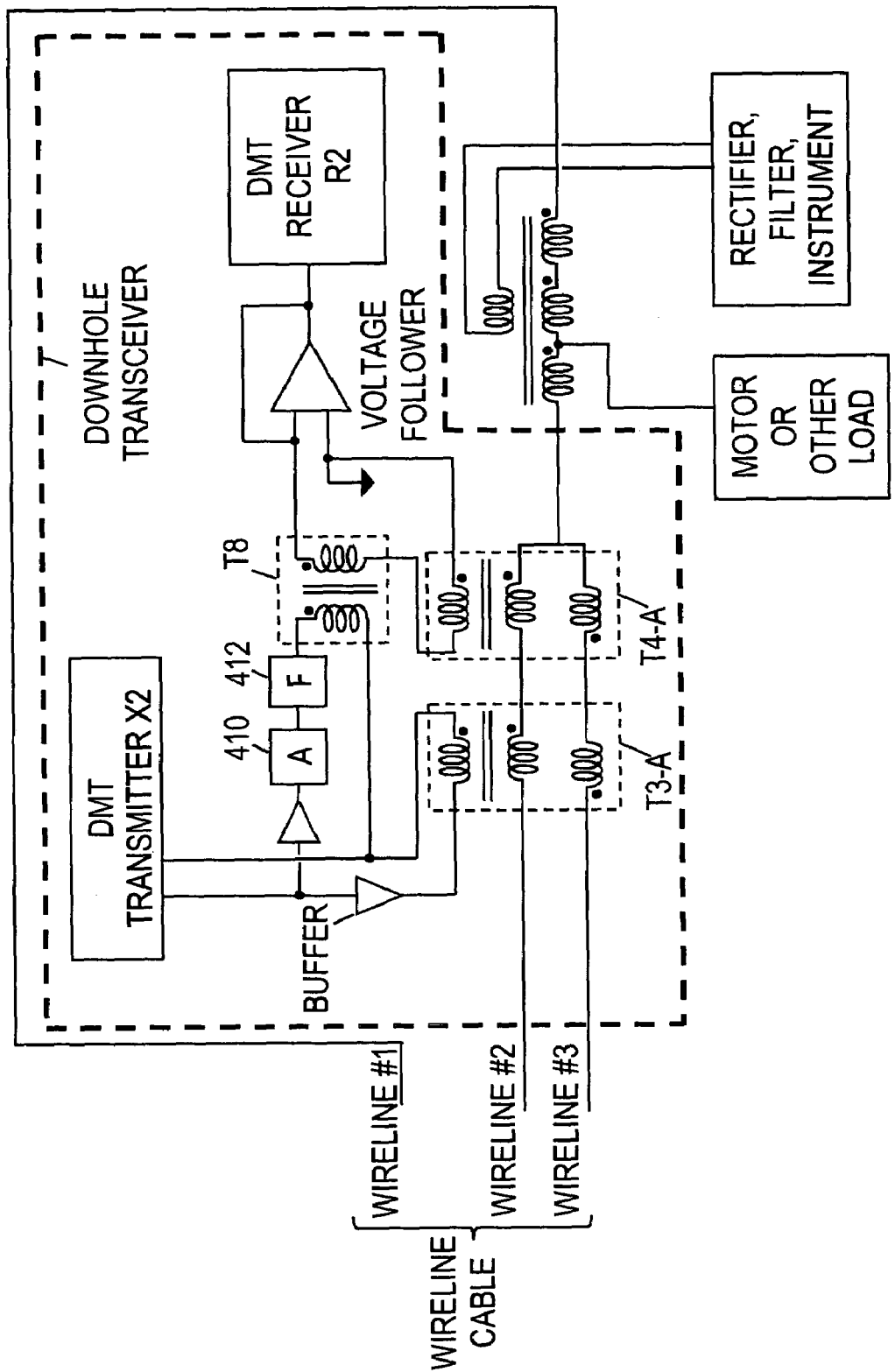
FIG. 5b shows a downhole transceiver system used with a three-conductor wireline according to an embodiment of the invention.

FIG. 5b shows a downhole transceiver system according to another downhole telemetry system embodiment. In many respects, the downhole transceiver system functions similarly to the uphole transceiver system shown in FIG. 5a. In a preferred embodiment of the invention, the uphole transceiver system of FIG. 5a and the downhole transceiver system of FIG. 5b may transmit/receive data via a three-conductor wireline cable.

In operation, DMT transmitter X2 of FIG. 5b outputs an uplink signal. The uplink signal is coupled to the wireline cable by transformer T3-A. In a preferred embodiment, T3-A is optimized to operate at high signal levels over a frequency band allocated for uplink data transmission. For example, if uplink signals are transmitted over a frequency range from approximately 32 kHz to 256 kHz, T3-A would preferably be optimized to operate within that frequency band.

In order to optimize the uplink coupling operation of T3-A, the coils of T3-A may have a turns ratio so that the transmitter output impedance is matched to the cable characteristic impedance over the frequency range allocated for uplink transmissions. Again, it is noted that embodiments of the downhole transceiver may be designed to couple uplink transmissions to the wireline cable over any pre-determined frequency range.

The downhole transceiver system of FIG. 5b receives downlink data from the wireline cable using transformers T4-A. T4-A is preferably optimized to operate over a frequency range allocated for the transmission of downlink data. For example, if downlink data is transmitted/received over a frequency band of approximately 4 kHz to 12 kHz, transformer T4-A would use a number of turns in the primary and secondary coils so as to match impedance (at those frequencies) with the wireline cable characteristics and input impedance of DMT receiver R2. As previously mentioned, T3-A may be optimized to couple uplink signals to the wireline cable while T4-A may be optimized to receive downlink signals.

The receiving transformer T4-A not only picks up the desired downlink signal, but the unwanted uplink signal as well. In order to separate the local transmitter signal (uplink signal) from the downlink signal, a replica of the uplink signal is preferably subtracted from the combined uplink/downlink signal received by T4-A. As shown, transformer T8 may be used to subtract the replica of the uplink signal from the combined received signal. The result preferably isolates the downlink signal (i.e. the uplink signal and negative uplink signal cancel each other) which is passed through a voltage follower to the DMT receiver R2 for processing.

In alternative embodiments of the transceivers of FIGS. 5a and 5b, an operational amplifier configured as an inverting amplifier with a summing junction having two inputs may be used to provide isolation of the uplink or downlink signal from the combined received signal. In such embodiments, one of the two inputs to the summing junction may be the combined uplink/downlink signal while the second input to the summing junction is the negative of the replica of the signal to be cancelled.

As previously described, the uplink replica may be fine-tuned or otherwise regulated (modified) using an amplitude adjustment block 410 and/or a phase adjustment block 412 such that the uplink signal and the replica cancel each other out across transformer T8 more completely. In at least some embodiments, the amplitude adjustment block 410 comprises a resistive filter, and the phase adjustment block comprises a capacitive and/or inductive filter. In some embodiments, an adaptive filter may be used as described above.

The above discussion is meant to be illustrative of the principles and various embodiments of the present invention. Numerous other variations and modifications will become apparent to those skilled in the art once the above disclosure is fully appreciated. It is intended that the following claims be interpreted to embrace all such variations and modifications.

What is claimed is:

1. A downhole telemetry system, comprising:
   a surface transceiver, configured to isolate an uplink signal using time-domain signal cancellation;
   a wireline cable; and
   a downhole transceiver coupled to the surface transceiver via the wireline cable and configured to isolate a downlink signal using time-domain signal cancellation.

2. The telemetry system of claim 1 wherein said time-domain signal cancellation comprises passing a first signal and a second signal across opposite coils of a transformer such that the first signal cancels part of the second signal.

3. The telemetry system of claim 2 wherein in the surface transceiver said first signal comprises a replica of the uplink signal and said second signal comprises a combined uplink/downlink signal.

4. The telemetry system of claim 2 wherein in the downhole transceiver said first signal comprises a replica of the downlink signal and said second signal comprises a combined uplink/downlink signal.

5. The system of claim 1 wherein said time-domain signal cancellation comprises an operational amplifier that sums two inputs.

6. The system of claim 1 wherein the wireline cable is a seven-conductor wireline cable.

7. The system of claim 1 wherein the wireline cable is a three-conductor wireline cable.

8. A transceiver for use in a downhole telemetry system, comprising:
   a transmitter;
   a receiver;
   a first set of one or more transformers that couple a transmitter signal from the transmitter to a wireline cable;
   a second set of one or more transformers coupled to the wireline cable and configured to receive a wireline cable signal; and
   a cancellation transformer coupled to the transmitter, the receiver, and the second set of transformers, wherein the cancellation transformer is configured to substantially remove transmitter signal interference from the wireline cable signal and a output a result to the receiver.

9. The transceiver of claim 8 wherein the first set of one or more transformers is impedance matched for optimal operation over a frequency range allocated for the transmitter signal.

10. The transceiver of claim 9 wherein the second set of transformers is impedance matched for optimal operation over a frequency range allocated for the signal transmitted by another transceiver.

11. The transceiver of claim 10 further comprising a filter coupled to the cancellation transformer and configured to provide the cancellation transformer with a modified copy of the transmitter signal.

12. The transceiver of claim 11 further comprising a voltage follower circuit coupled to the transformer and the receiver, the voltage follower circuit receives a signal from the cancellation transformer and outputs the signal to the receiver.

13. The transceiver of claim 12 wherein the wireline cable is a seven-conductor wireline cable.

14. The transceiver of claim 12 wherein the wireline cable is a three-conductor wireline cable.

15. A method of communication between an uphole transceiver and a downhole transceiver of a downhole telemetry system, comprising:
   transmitting a downlink signal;
   receiving a wireline signal; and
   separating an uplink signal from the wireline signal using time-domain signal cancellation.

16. The method of claim 15 further comprising:
   transmitting an uplink signal; and
   separating a downlink signal from the wireline signal using time-domain signal cancellation.

17. The method claim 16 wherein said time-domain cancellation comprises passing a first signal and a second signal across opposite coils of a transformer such that the first signal cancels part of the second signal.

18. The method of claim 17 wherein said first signal comprises a copy of the uplink signal and the second signal comprises a combined uplink/downlink signal.

19. The method of claim 17 wherein said first signal comprises a copy of the downlink signal and the second signal comprises a combined uplink/downlink signal.

20. The method of claim 18 wherein said transmitting a downlink signal, receiving a wireline signal, and separating an uplink signal is carried out by the uphole transceiver.

21. The method of claim 19 wherein said transmitting an uplink signal and separating a downlink signal is carried out by the downhole transceiver.

22. A downhole telemetry system, comprising:
   a surface transceiver that cancels a locally transmitted downlink signal using time-domain cancellation and transmits electrical power and telemetry signals downhole using separate transmission modes;
   a wireline cable having three conductors; and
   a downhole transceiver coupled to the surface transceiver via the wireline cable and configured to cancel a local transmitted uplink signal using time-domain signal cancellation.

23. The telemetry system of claim 22 wherein a first transmission mode comprises a first conductor that does not transmit power, a second conductor that transmits a positive voltage, and a third conductor that transmits a negative voltage equal in magnitude to the positive voltage transmitted by the second conductor.

24. The telemetry system of claim 22 wherein a second transmission mode comprises a first conductor that transmits a negative voltage, and a second conductor and third conductor that each transmit a positive voltage having one-half a magnitude of the negative voltage.

25. The telemetry system of claim 22, wherein a third transmission mode comprises a first conductor, second conductor, and third conductor that transmit an equal voltage.

* * * * *